US009899896B2

(12) United States Patent  (10) Patent No.: US 9,899,896 B2
Hyttinen  (45) Date of Patent: Feb. 20, 2018

(54) SOLAR POWER PLANT

(71) Applicant: ABB Oy, Helsinki (FI)

(72) Inventor: Jarkko Hyttinen, Espoo (FI)

(73) Assignee: ABB Oy, Helsinki (FI)

( * ) Notice: Subject to any disclaimer, the term of this patent is extended or adjusted under 35 U.S.C. 154(b) by 715 days.

(21) Appl. No.: 14/171,099

(22) Filed: Feb. 3, 2014

(65) Prior Publication Data

US 2014/0224450 A1  Aug. 14, 2014

(30) Foreign Application Priority Data

Feb. 11, 2013  (EP) ...................................... 13154747

(51) Int. Cl.
F24D 5/10 (2006.01)
H02K 9/08 (2006.01)
F03G 6/00 (2006.01)

(52) U.S. Cl.
CPC ................. H02K 9/08 (2013.01); F03G 6/00 (2013.01); *Y02E 10/46* (2013.01)

(58) Field of Classification Search
CPC ... H02K 9/08; H02K 9/14; H02K 9/16; F03G 6/00; F03G 6/003; F03G 6/005; Y02E 10/46
USPC ........ 165/10, 45, 48.2, 50, 53, 59, 213, 214, 165/244, 248, 249, 250; 62/259.1, 260, 62/404, 407, 408, 410, 411, 412
See application file for complete search history.

(56) References Cited

U.S. PATENT DOCUMENTS

| 1,252,472 | A | * | 1/1918 | Miles | .................... F24F 5/0007 |
| | | | | | 454/236 |
| 2,462,557 | A | * | 2/1949 | Santee | .................... F24D 15/04 |
| | | | | | 165/49 |
| 2,722,107 | A | * | 11/1955 | Gay | ........................ F24D 11/02 |
| | | | | | 62/157 |
| 2,724,578 | A | * | 11/1955 | Swank | .................... F24F 1/027 |
| | | | | | 165/48.1 |

(Continued)

FOREIGN PATENT DOCUMENTS

CN       201509010 U       6/2010
CN       101959394 A       1/2011

(Continued)

OTHER PUBLICATIONS

Office Action dated Oct. 9, 2015, issued by the Chinese Patent Office in corresponding Chinese Patent Application No. 201410046257.0 and an English translation of the Office Action. (15 pages).

(Continued)

*Primary Examiner* — Claire Rojohn, III
(74) *Attorney, Agent, or Firm* — Taft Stettinius & Hollister LLP

(57) ABSTRACT

A system for cooling a solar power plant is provided. The system has a foundation, a protective housing built on the foundation, and one or more heat sources inside the protective housing. An air inlet can provide a cooling air flow from outside the protective housing to inside the protective housing, and an air outlet can allow an air flow heated by the at least portion of the heat sources to exit the protective housing. An air duct system within the foundation can direct at least part of an incoming air flow to another part in the protective housing.

15 Claims, 1 Drawing Sheet

(56) References Cited

U.S. PATENT DOCUMENTS

| | | | |
|---|---|---|---|
| 4,275,538 A * | 6/1981 | Bounds | E02D 27/32 |
| | | | 126/617 |
| 4,779,006 A | 10/1988 | Wortham | |
| 5,392,846 A * | 2/1995 | Gardner | F24F 3/001 |
| | | | 165/122 |
| 2005/0183435 A1* | 8/2005 | Aubin | F24F 5/0017 |
| | | | 62/259.1 |
| 2007/0056304 A1* | 3/2007 | Everett | F24F 5/0046 |
| | | | 62/260 |
| 2007/0072541 A1* | 3/2007 | Daniels, II | F24F 7/02 |
| | | | 454/365 |
| 2011/0139403 A1* | 6/2011 | Urch | F24F 5/0035 |
| | | | 165/104.13 |

FOREIGN PATENT DOCUMENTS

| | | |
|---|---|---|
| CN | 202261069 U | 5/2012 |
| CN | 202395360 U | 8/2012 |
| CN | 202678775 U | 1/2013 |
| DE | 20 2012 101 290 U1 | 5/2012 |

OTHER PUBLICATIONS

European Search Report dated Nov. 6, 2013.

* cited by examiner

SOLAR POWER PLANT

RELATED APPLICATION(S)

This application claims priority under 35 U.S.C. § 119 to European Patent Application No. 13154747.3 filed on Feb. 11, 2013, the entire content of which is hereby incorporated herein by reference in its entirety.

FIELD

The disclosure relates to solar power plants, and for example, to cooling of such a power plant.

BACKGROUND INFORMATION

Modern day electrical components can produce heat. For example, in solar power generation, heat can be seen as an undesirable side product. For example, an excessive temperature caused by heat can prevent a solar power plant from operating.

A solar power plant may comprise different heat sources, such as frequency converter modules. These heat sources may be cooled with an incoming cooling air flow. As the air flow heats up in the process of cooling the heat sources, it can gradually lose its cooling properties. As a result, areas of cooler and hotter air may form within the power plant. The hottest areas can be those furthest away from the air inlets while the coolest areas are those close to the air inlets. Hot areas in the power plant may have a significant effect on the efficiency of the power plant as they may cause parts of the power plant reach their maximum operating temperatures earlier.

The hot areas may be cooled down by adding more air inlets. The additional air inlets, however, can increase implementation costs and can cause harmful environmental effects, such as dirt and humidity. The additional inlets may also decrease heat insulation of the power plant and increase draught during strong wind. In colder climates and during cold weather, draught and/or the lack of sufficient heat insulation may cause the power plant to be over-cooled. The power plant may thus use additional heating, which, in turn, may increase costs.

Further, if the ambient air temperature is too high for providing a sufficient cooling effect, additional air inlets may not improve cooling. In such cases, for example, heat exchangers and compressors can be used.

SUMMARY

A solar power plant is disclosed, the solar plant comprising: a foundation; a protective housing on the foundation; one or more heat sources inside the protective housing; an air inlet configured to provide an incoming air flow of cooling air from outside the protective housing to a part inside the protective housing; an air duct system within the foundation, adapted for directing at least part of the incoming air flow to a part inside the protective housing; and an air outlet configured to allow an air flow heated by the one or more heat sources to exit the protective housing.

A method for cooling a solar power plant is disclosed, the solar power plant having a foundation, a protective housing on the foundation, and one or more heat sources inside the protective housing, the method comprising: providing an incoming air flow of cooling air via an air inlet from outside the protective housing to a part inside the protective housing; directing at least part of the incoming air flow to a part inside the protective housing via an air duct system within the foundation; and allowing an air flow heated by the heat sources to exit the protective housing via an air outlet.

BRIEF DESCRIPTION OF THE DRAWINGS

In the following the disclosure will be described in greater detail by means of exemplary embodiments with reference to the attached drawings, in which.

DETAILED DESCRIPTION

Figure 1:
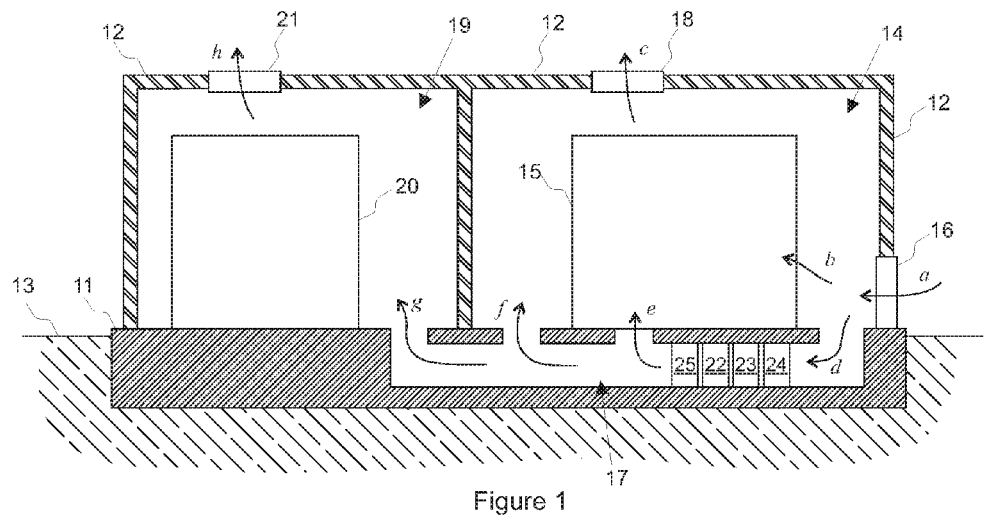
FIG. 1 illustrates an exemplary solar energy plant according to the present disclosure.

In accordance with an exemplary embodiment, formation of hot areas in a machine room can be minimised by directing part of an incoming air flow through an air duct or air ducts formed within the foundations of the power plant. For example, this part of the air flow can be directed to those parts of the machine room, which would not otherwise be properly cooled.

In accordance with an exemplary embodiment, walls of the air ducts can be used for further cooling the air flow passively when the temperature of the foundations is lower than the ambient air temperature. The air flow through the air ducts can be activated, for example, when the cooling effects provided by the incoming air flow and the foundations are not sufficient. For example, the disclosed arrangement can improve cooling without adding more air inlets.

In accordance with an exemplary embodiment, the disclosed method can be used for cooling of a solar power plant including, for example, a foundations structure (i.e., a foundation), a protective housing being built on the foundations structure, and/or one or more heat sources inside the protective housing. The protective housing, for example, can include a machine room including frequency converter modules as heat sources.

In the protective housing, one or more air inlets can provide an incoming air flow of cooling air from outside the protective housing to a part, such as a machine room, inside the protective housing. The incoming air flow may be used for cooling at least a portion of the heat sources, for example. The incoming air flow may also cool other areas inside the protective housing. One or more air outlets can allow an air flow heated by the heat sources to exit the protective housing.

According to an exemplary embodiment of the disclosed method, at least part of the incoming air flow may be directed to a part inside the protective housing by using an air duct system within the foundations structure. The air duct system can include one or more air ducts, which may have been formed into a foundations structure, for example, during construction of the structure. In accordance with an exemplary embodiment, some or all of the incoming flow through the air inlet(s) may pass through the air ducts and may be directed to desired parts of the protective housing. In other words, said part inside the protective housing may be the same part the incoming air flow flows to or it may be another part inside the protective housing.

In the case where the incoming air flow coming from one direction would otherwise be heated up before reaching a portion of the heat sources, the air duct system can be used for directing at least part of the incoming air flow to cool this portion of the heat sources directly. The air duct system may also be used for directing at least part of the incoming air flow to cool a portion of the heat sources from another direction. Further, if the protective housing includes more than one machine room or area requiring cooling, the air duct system may direct at least part of the incoming air flow to another machine room or area.

In accordance with an exemplary embodiment of the disclosed method, the air duct system may be adapted for cooling the airflow passing through the air duct system. A cooling effect of the foundations structure and the surrounding ground, for example, may be utilised. The foundations structure can be in contact with the ground and is thus cooled by the ground. When the temperature of the foundations structure is lower than the ambient air temperature, the walls of the air ducts of the air duct system may be used for passively cooling the air flow passing through the air duct system. The air flow may be in direct contact with the walls or a heat exchanger, for example, may be used. The lowered temperature of the air flow through the air ducts may then be used for reducing the need for cooling and/or increasing output of the power plant. The air duct system may also be provided with active means, such as a refrigerator unit, for actively cooling the airflow passing through the air ducts.

The air duct system can be adapted to only provide additional cooling when the cooling effect of the incoming air flow is not sufficient. For example, additional cooling of air may be activated only during at a peak utilisation rate of the power plant. In accordance with an exemplary embodiment, this can allow the foundations structure and the surrounding ground to cool down during lower utilisation rates. The air flow through the air ducts can be controlled by a fan in the air duct system, for example. The fan may be controlled, for example, based on the temperature, humidity and/or cooling requirements of the power plant and its components. The air in the air ducts may also be filtered by using an air filter and the air flow can be directed to its target(s) by nozzles.

FIG. 1 illustrates an exemplary solar energy plant according to the present disclosure. The solar energy plant in FIG. 1 can include a foundations structure 11 and a protective housing 12. The foundations structure 11 in FIG. 1 can be partially within ground 13. The protective housing 12 can be built on the foundations 11 and includes a first machine room 14 inside the protective housing 12. A heat source in the form of a frequency converter 15 can be in the first machine room 14. The frequency converter 15 can include a plurality of frequency converter modules.

An air inlet 16 in the protective housing 12 can provide an incoming air flow a of cooling air from outside the protective housing 12 to a part of the first machine room 14 in order to cool at least part of the frequency converter 15. In FIG. 1, a part b of air flow a cools the part of the frequency converter 15 nearest to the air inlet 16.

The protective housing 12 in FIG. 1 can also have an air outlet 18 for allowing an air flow c heated by the frequency converter 15 to exit from the first machine room 14 to outside the protective housing 12.

However, within the foundations structure 11 there can also be an air duct system which is adapted for directing a part d of the incoming air flow a to another part inside the protective housing 12. In FIG. 1, the air duct system includes an air duct 17. In accordance with an exemplary embodiment, if the foundations structure 11 is made of concrete, for example, the air duct 17 may have been formed into the structure 11 during the casting of the structure 11. The material of the foundations structure 11 is not, however, limited to concrete. Structures formed of other material/materials, such as steel structures, can also be used for the foundations.

The air duct 17 can be adapted for directing a part e of the air flow d passing through the air duct 17 to cool another part of the frequency converter 15. Another part f of the air flow d passing through the air duct 17 provides cooling air to an area beside the frequency converter 15 in the first machine room 14.

In addition to the first machine room 14, the protective housing 12 includes a second machine room 19 in FIG. 1. The second machine room 19 includes a heat source in the form of a second frequency converter 20. The air duct 17 in FIG. 1 is also adapted for directing a part g of the air flow d to the second machine room 19. In FIG. 1, the protective housing 12 can also have another air outlet 21 for allowing an air flow h heated by the second frequency converter 20 to exit the second machine room 19 to outside the protective housing 12.

In accordance with an exemplary embodiment, in order to utilise the cooling effect of ground, walls of the air duct 17 in FIG. 1 can be adapted for passively cooling the airflow d passing through the air duct 17. When the temperature of the foundations structure 11 is lower that the ambient air temperature, the walls of the air duct 17 may be used to further cool the air flow d passing through the air duct 17. In accordance with an exemplary embodiment, in order to enhance the cooling provided by ground, the air duct 17 can also include a heat exchanger 22.

The air duct 17 can also include an active means 25 for actively cooling the airflow d passing through the air duct 17. For example, instead of or in addition to the heat exchanger 22, the air duct 17 may include a refrigeration unit 25.

In FIG. 1, the incoming air flow a can provide a basic cooling of the power plant. The air duct system in FIG. 1 is not constantly active. The air duct system can be adapted to provide additional cooling only when a cooling effect of the incoming air flow a is not sufficient for cooling the heat sources 15 and 20. In accordance with an exemplary embodiment, the air duct system may activate additional ventilation, for example, through the air duct 17 when a de-rating limit of the solar power plant is exceeded. The activation may occur, for example, when the solar power plant is producing power at its maximum while the ambient air temperature is high. In accordance with an exemplary embodiment, in order to control the air flow d through the air duct 17, the air duct system in FIG. 1 includes a fan 23. The fan 23 can be controlled on the basis of the ambient air temperature and humidity and/or cooling requirements of the frequency converters 15 and 20, for example. The air duct system may also include an air filter 24, for example, in order to avoid dust from accumulating.

Figure 2:
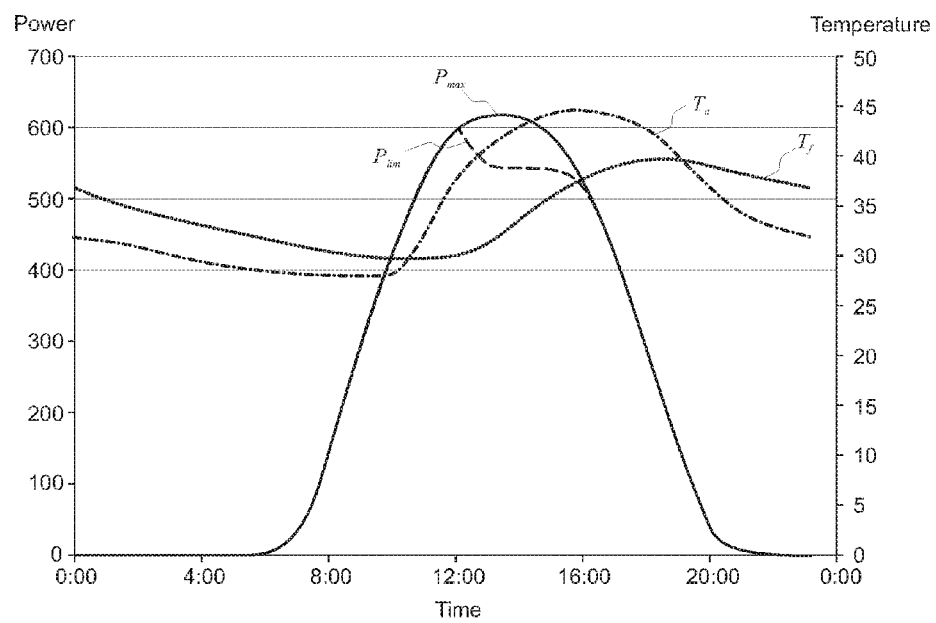
FIG. 2 illustrates an exemplary daily cycle of power generation of a solar power plant.

FIG. 2 illustrates an exemplary daily cycle of the solar power plant of FIG. 1. The dot-dashed line shows the daily cycle of an ambient air temperature $T_a$. The dotted line shows a temperature $T_f$ of the foundations structure 11. The solid line shows a maximum power $P_{max}$ the solar power plant can draw from sun light. The maximum power rises as the amount of sunlight increases. The ambient air temperature $T_a$ starts to rise as solar irradiation increases. The power $P_{max}$ peaks approximately at 1 μm as then the solar irradiation is strongest.

The dashed line shows a power output $P_{lim}$, when no additional cooling by the air duct system is used. First, the power output $P_{lim}$ rises following the maximum power $P_{max}$. However, the cooling capacity of the ambient air decreases as its temperature $T_a$ increases, and the power output $P_{lim}$ of the power plant has to be de-rated in order to avoid overheating.

The maximum power $P_{max}$ can be drawn when the air duct system of FIG. 1 is used. FIG. 2 shows that the air duct 17 provides additional cooling so that all sunlight can be utilised even during the mid-day hours.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A solar power plant, the solar power plant comprising:
a foundation;
a protective housing on the foundation;
one or more heat sources inside the protective housing;
an air inlet in the protective housing for providing an incoming air flow of cooling air from outside the protective housing to a part inside the protective housing through the air inlet to provide a basic cooling of the solar power plant;
an air duct system within the foundation directing at least part of the incoming air flow from the air inlet in the protective housing to a part inside the protective housing, wherein walls of one or more air ducts of the air duct system passively cool the airflow passing through the air duct system, to provide an additional cooling of the solar power plant, wherein the air duct system provides said additional cooling in response to a de-rating limit of the solar power plant being exceeded;
an air outlet allowing an air flow heated by the one or more heat sources to exit the protective housing;
a room within the protective housing, and one or more of the heat sources in the room;
wherein the air inlet provides the incoming air flow to at least part of the room for cooling at least a portion of the one or more heat sources;
wherein the air duct system directs at least part of the incoming air flow to another part inside the protective housing; and
an air outlet allows an air flow heated by the one or more heat sources to exit from the room to outside the protective housing;
wherein the air duct system directs at least part of the incoming air flow to another room within the protective housing.

2. A solar power plant according to claim 1, comprising:
a cooling unit actively cooling the airflow passing through the air duct system.

3. A solar power plant according to claim 1, wherein the air duct system directs at least part of the incoming air flow to cool another portion of the one or more heat sources.

4. A solar power plant according to claim 1, comprising:
a fan controlling the air flow through the air duct system.

5. A method for cooling a solar power plant, the solar power plant having a foundation, a protective housing on the foundation, one or more heat sources inside the protective housing, the protective housing includes a room, and one or more of the heat sources in the room, the method comprising:
providing an incoming air flow of cooling air from outside the protective housing to a part inside the protective housing, wherein the incoming air flow is provided via an air inlet in the protective housing, to provide a basic cooling of the solar power plant;
directing at least part of the incoming air flow from the air inlet in the protective housing to a part inside the protective housing via an air duct system within the foundation, wherein walls of one or more air ducts of the air duct system passively cool the airflow passing through the air duct system, to provide an additional cooling of the solar power plant, wherein said additional cooling is provided in response to a de-rating limit of the solar power plant being exceeded;
allowing an air flow heated by the heat sources to exit the protective housing via an air outlet;
providing the incoming air flow to at least part of the room for cooling at least part of the one or more heat sources via the air inlet;
directing at least part of the incoming air flow to another part inside the protective housing via the air duct system;
allowing an air flow heated by the one or more heat sources to exit from the room to outside the protective housing via an air outlet;
directing at least part of the incoming air flow to cool another portion of the one or more heat sources via the air duct system; and
directing at least part of the incoming air flow to another room within the protective housing via the air duct system.

6. A solar power plant according to claim 1, comprising:
a heat exchanger within the air duct system.

7. A method for cooling a solar power plant, the solar power plant having a foundation, a protective housing on the foundation, and one or more heat sources inside the protective housing, the method comprising:
providing an incoming air flow of cooling air from outside the protective housing to a part inside the protective housing, wherein the incoming air flow is provided via an air inlet in the protective housing, to provide a basic cooling of the solar power plant;
directing at least part of the incoming air flow from the air inlet in the protective housing to a part inside the protective housing via an air duct system within the foundation, wherein walls of one or more air ducts of the air duct system passively cool the airflow passing through the air duct system, to provide an additional cooling of the solar power plant, wherein said additional cooling is provided in response to a de-rating limit of the solar power plant being exceeded; and
allowing an air flow heated by the heat sources to exit the protective housing via an air outlet.

8. A method for cooling a solar power plant according to claim 7, comprising:
actively cooling the airflow passing through the air duct system.

9. A method for cooling a solar power plant according to claim 7, comprising:
controlling the air flow through the air duct system using a fan.

10. A method for cooling a solar power plant according to claim 7, comprising:
filtering the air flow within the air duct system using an air filter.

11. A method for solar power plant according to claim 7, comprising:
cooling the air flow with a heat exchanger within the air duct system.

12. A cooling arrangement of a solar power plant, the solar power plant comprising:
a foundation;
a protective housing on the foundation;
one or more heat sources inside the protective housing;

an air inlet in the protective housing for providing an incoming air flow of cooling air from outside the protective housing to a part inside the protective housing to provide a basic cooling of the solar power plant;

an air outlet allowing an air flow heated by the one or more heat sources to exit the protective housing;

a room within the protective housing, and one or more of the heat sources in the room;

wherein the air inlet provides the incoming air flow to at least part of the room for cooling at least a portion of the one or more heat sources; and an air outlet allows an air flow heated by the one or more heat sources to exit from the room to outside the protective housing;

wherein the cooling arrangement comprises an air duct system within the foundation directing at least part of the incoming air flow from the air inlet in the protective housing to a part inside the protective housing, wherein walls of one or more air ducts of the air duct system passively cool the airflow passing through the air duct system, to provide an additional cooling of the solar power plant, wherein the air duct system provides said additional cooling in response to a de-rating limit of the solar power plant being exceeded;

wherein the air duct system directs at least part of the incoming air flow to another part inside the protective housing.

13. A solar power plant according to claim 1, wherein the foundation is at least partially embedded to ground.

14. A method according to claim 7, wherein the foundation is at least partially embedded to ground.

15. A cooling arrangement according to claim 12, wherein the foundation is at least partially embedded to ground.

\* \* \* \* \*